Patented Dec. 14, 1937

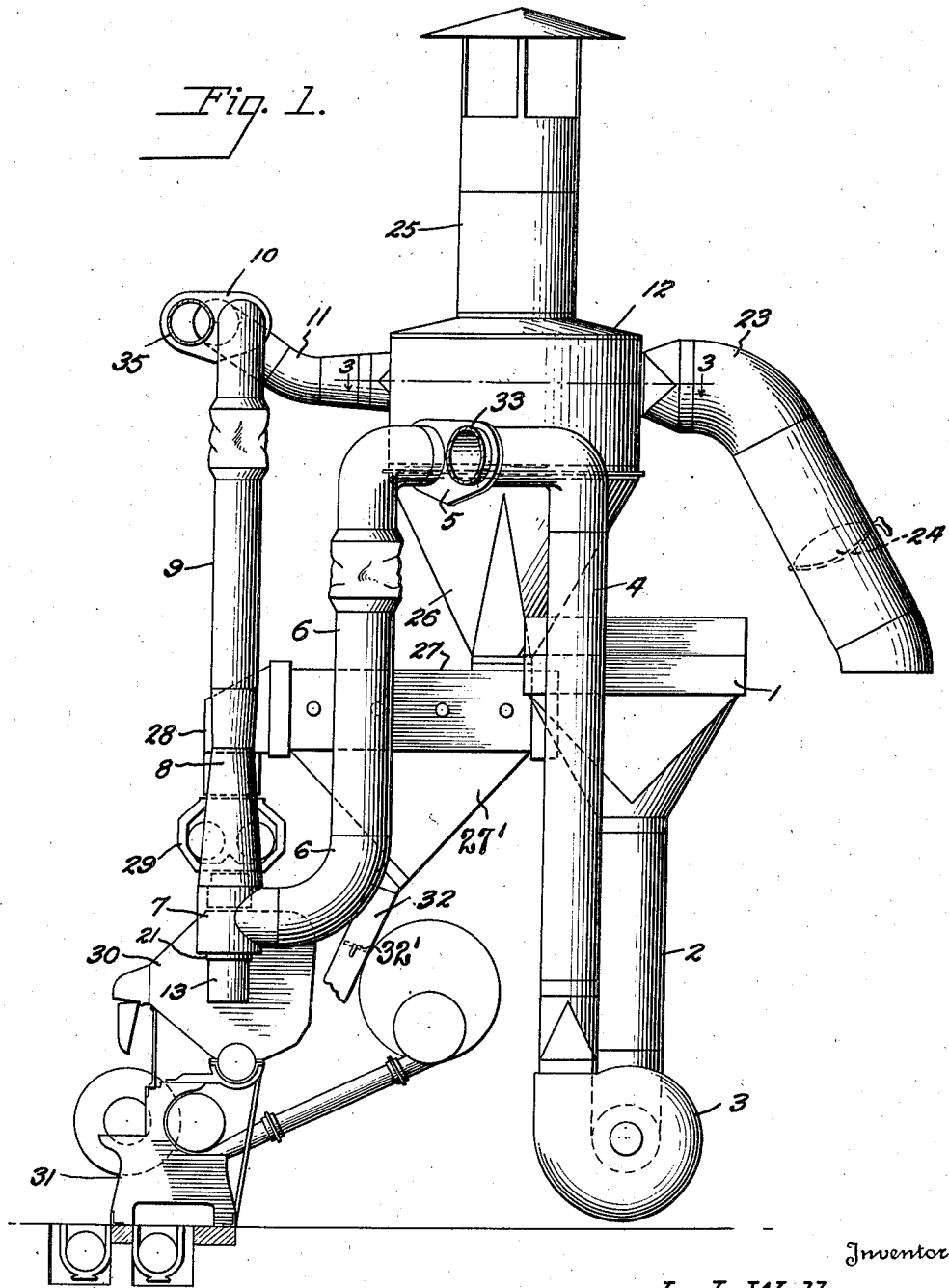

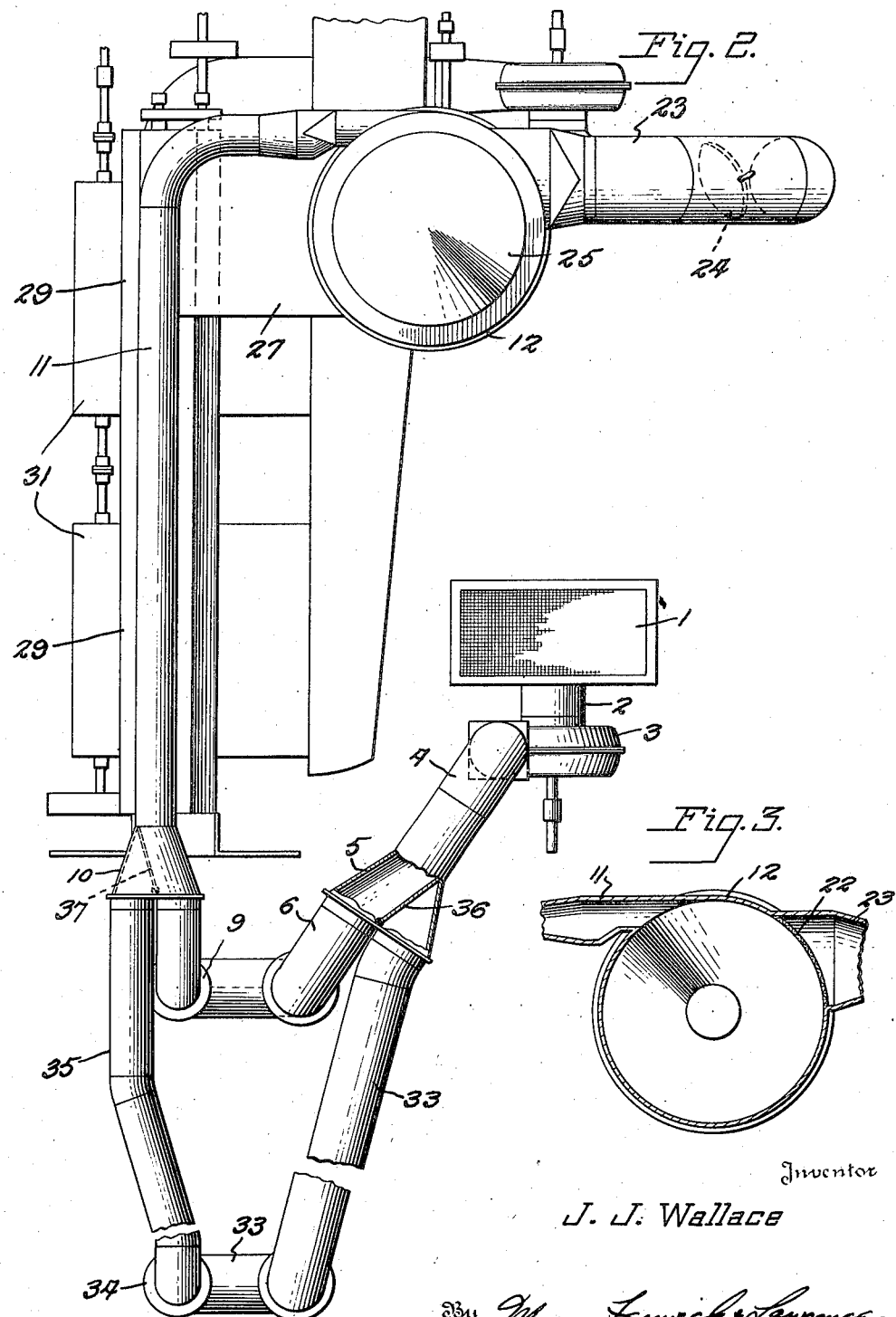

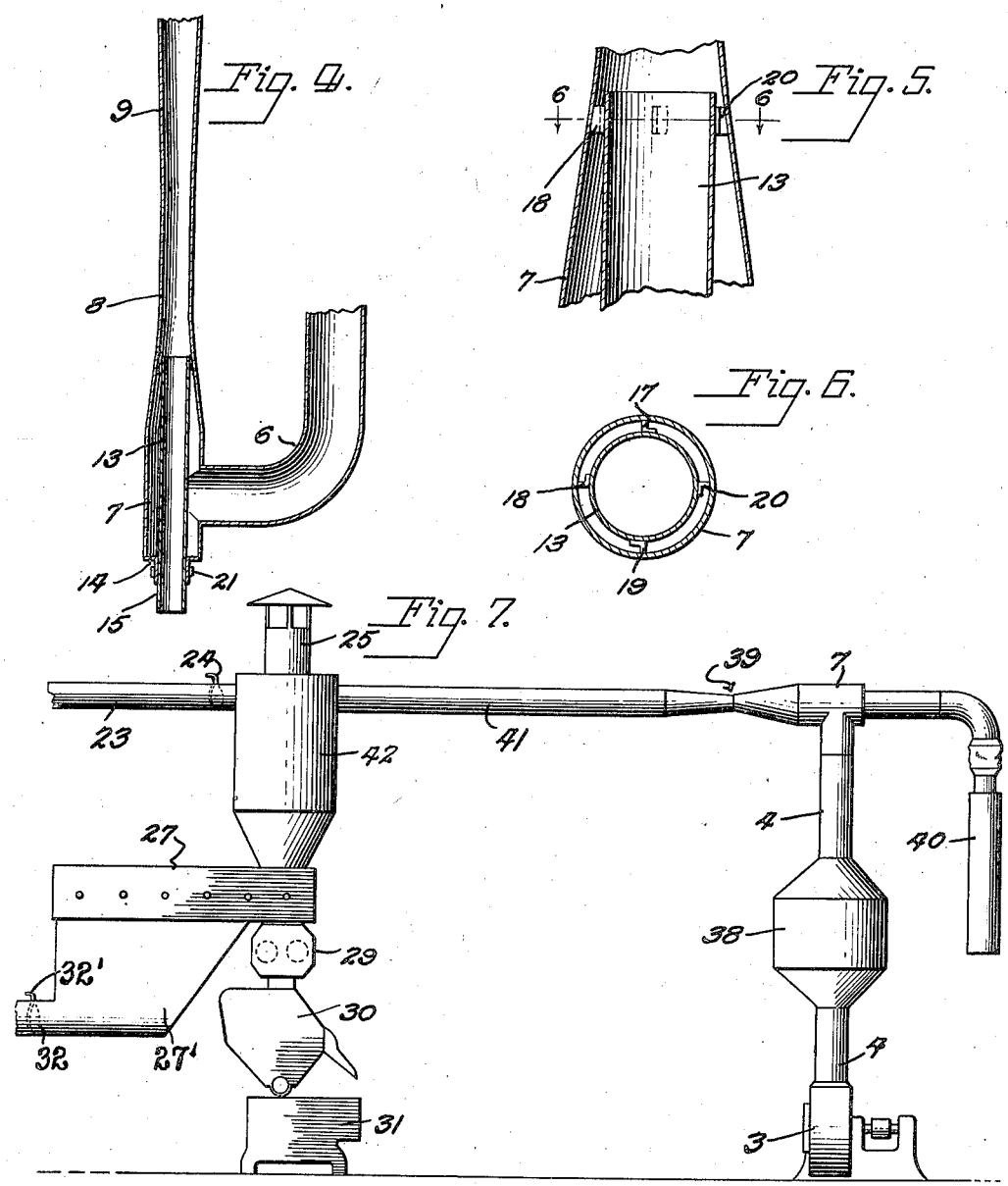

2,102,499

UNITED STATES PATENT OFFICE 2,102,499

COTTON HANDLING APPARATUS

Jeffrey John Wallace, Amite, La., assignor to Gullett Gin Company, Amite, La.

Application April 28, 1936, Serial No. 76,870

1 Claim. (Cl. 19—72)

The invention forming the subject matter of this application relates to apparatus by which seed cotton is elevated, dried and cleaned by the application thereto of air under pressure.

In apparatus heretofore in common use for elevating and drying seed cotton, the cotton is drawn by suction from a source of supply to a separator in which the air is separated from the cotton, and in which the vacuum due to suction, is broken to permit the cotton to fall by gravity into the cleaner-feeders which conduct the cotton to the gins proper. Under present methods of gathering the cotton crop, more and more foreign materials are gathered with the cotton than was formerly the case. More of the crop is gathered while it is in a very damp condition as after rain, or early in the morning after heavy wet fogs or dew. To gin cotton in this damp condition, damages its fibers, and frequently slows down operation due to the choking of the various machines in the gin plants by this damp cotton.

The main object of the present invention is to process the seed cotton, whatever its condition may be, so as to dry the same and remove practically all of the leaves, sand, limbs and other debris during the feeding thereof toward the cleaner-feeders which precede the gins proper.

Other objects of the invention will become apparent as the detailed description thereof proceeds.

In the drawings:

Figure 1 is an end elevation through the cotton elevating, drying and cleaning apparatus which constitutes the present invention;

Figure 2 is a fragmentary plan view of the apparatus shown in Figure 1;

Figure 3 is a horizontal section taken on the line 3—3 of Figure 1;

Figure 4 is a fragmentary sectional detail of an injector which forms an essential part of the apparatus illustrated in Figure 1;

Figure 5 is a fragmentary longitudinal section through part of the device shown in Figure 4;

Figure 6 is a horizontal transverse section taken on the line 6—6 of Figure 5; and Figure 7 is a diagrammatic lay-out of a modified form of the invention illustrated in Figure 1.

Referring now particularly to Figures 1 and 2 of the drawings, the apparatus comprises a heater element 1 connected to any suitable source of heat supply. The heater element 1 is connected by a pipe 2 to a fan 3, which on its pressure side is connected by a pipe 4 to a header 5.

This header 5 is connected by a piping 6 to the lower end of a reservoir casing 7, forming part of a pneumatic injector for directing air from the pump 3 through a Venturi section 8 and a pipe 9 to a header 10, which in turn is connected by piping 11 to a cyclone dropper 12.

A pipe 13, adjustable lengthwise in the casing 7, has one end thereof projecting beyond the lower end 14 of the said casing 7. The projecting end 15 of the adjustable pipe 13 is designed for connection to any suitable elbow telescope connection for elevating seed cotton from a wagon, or cotton storage, up to and through the pipe 13 until it meets the high velocity air at the inner end of pipe 13, and is then carried under pressure to the cyclone 12.

The inner end of the pipe 13 is supported by small angle irons 17, 18, 19 and 20, suitably secured to casing 7, to slide axially in the casing 7, to permit the air under pressure to escape from the reservoir formed by the casing 7 and pipe 13 into the Venturi section 8. It will be apparent from Figures 4 and 5 of the drawings, that the axial adjustment of the pipe 13 in the casing 7 will vary the cross-sectional area of the passageway for the air under pressure between the reservoir 7 and Venturi section 8. Suitable clamping mechanism 21 may be used for securing the pipe 13 in any desired position of adjustment within the casing 7.

The air blast is regulated by the pump 3 so as to produce enough suction at the escape end of the pipe 13 to elevate the cotton from a wagon outside the building, or from cotton storage, up to the end of the pipe 13 where it enters the Venturi section 8. Beyond this point, the cotton is no longer subjected to suction, but is subjected to the high velocity of the blast of air forced through the piping by the pump 3. The cotton thus subjected to air under pressure is moved into the cyclone 12, wherein it is whirled around in such manner that practically all of the dust and debris is thrown out by centrifugal force through a screen 22 which forms part of the cylindrical side of the cyclone dropper and is enclosed by the upper end of a discharge spout 23 having its discharge outlet controlled by a valve 24. Due to cotton being under pressure and being spun in the circular cyclone dropper, the cotton is scoured along the surface of the screen. The air escaping through this screen carries with it the small leaf trash, sand and particles of foreign matter, and thus remove this foreign matter by centrifugal action as well as by the air blast.

The upper end of the cyclone dropper 12 is provided with a vent 25 to permit the discharge of air and light dust. The lower end of the cyclone dropper is shaped to form a hopper 26 which is connected to a cleaner 27, which in turn is connected by piping 28 to a distributor 29 extending lengthwise over a series of cleaner-feeders 30 which precede and connect to a battery of gins 31.

The cotton in the cleaner 27 is subjected to the pressure of the hot air blast, and the cleaner 27 carries the seed cotton over the usual screen. The air blast forces the debris from the cotton into a dust box 27' having a discharge outlet 32 controlled by a valve 32'.

The header 5 may be connected by a pipe 33 to the lower end of a reservoir forming part of an injector 34, similar to that shown in Figure 4 which in turn is connected at its upper end by a pipe 35 to the header 10. The headers 5 and 10 are provided with gates 36 and 37 hinged so that the air from the pump 3 may be bypassed from the pipes 6 and 9 through the piping 33, injector 34 and piping 35 to the header 10. In Figure 1 of the drawings, the pipes 33, 34, and 35 are omitted and the gates 36 and 37 are arranged so as to conduct the heated air through the pipes 6 and 9, and by-pass the pipes 33, 34 and 35. In Figure 2 the gates 36 and 37 are illustrated in position to bypass the said pipes. The pipe 33 and the pipes 34 and 35 connected thereto are intended to be used alternatively with the pipes 5, 6, and 9 to draw seed cotton from different sources of supply. Obviously, when one set of pipes is used the others cannot be used and the air forced through the piping by the fan 3 and heater 1 must be by-passed from one set of piping through the other, according to which of the two sets are in use.

In the form of the invention illustrated in Figure 7 the heater member 38 is connected to the pressure side of the pump 3. In this form of the invention the injector mechanism designated generally by the reference numeral 39, is arranged horizontally and is connected at one end to the flexible telescope connection 40 adapted to raise cotton from a wagon or from cotton storage. The other end of the injector pipe is connected by a pipe 41 to the cyclone dropper 42. The operation of this form of the invention is substantially the same as that disclosed in the other figures of the drawings, and need not be further described herein.

It will be apparent from the disclosure so far that some of the air under pressure in the cleaner 27 is forced into the distributor 29, and through the closed conveyor box into the feeder 30, which is provided with the usual screen and proper outlet for dust and debris. The cotton in this apparatus is thus submitted to the action of air under pressure from the moment it enters the jet, and the containers connected thereto, until it is delivered to the gins, the air pressure through the various parts being regulated as desired by the operation of outlet valves 24 and 32' in the cyclone dropper 12 and cleaner 27, respectively. The heating element in this apparatus heats the current of air forced through the cotton, from the time it is elevated from the wagon until it is delivered to the gins.

In the modified form of the invention shown in Figure 7, the heating unit is on the pressure side of the fan, so that cold air taken in by the fan will be forced through the heating unit and then conveyed to the reservoir on the jet and introduced into the cyclone dropper as before.

While it is preferable to use in this apparatus a cyclone dropper, it must be understood that this is not essential to the practice of the invention, since the conventional type of dropper may be substituted therefor and the blast of air, hot or cold, and may be applied to the cotton as before. The hot air provides a ready means for removing excess moisture from the cotton and provides for cotton ginning outfits a drying unit as well as a very efficient cleaning arrangement. In the cyclone dropper the cotton is whirled around, fluffed up and dried by the hot air; and this type of dropper has the very desirable feature of eliminating all moving parts heretofore found necessary in heaters of this general type.

In the described arrangement, there is only one fan employed to deliver cotton from the wagon to gin outfit; and this fan introduces hot air into the conduit pipe, by means of an injector, and uses the suction created by the injector to elevate cotton. In this manner it is possible to eliminate at least one fan in any gin outfit where drier installation is required. The safety vent at the top of the cyclone provides for the escape of hot air, in the event of the cleaner and distributor being choked up, and prevents injurious overheating of the cotton in the cleaner and distributor.

It is to be understood that the invention is not to be considered as limited to the specific construction and arrangement described herein, since it is evident that many changes may be made without departing from the scope of the invention as defined by the claim appended hereto.

What I claim is:

Cotton drying and feeding apparatus comprising a cotton cleaner, a cyclone dropper connected to said cleaner and having a wall thereof provided with a screen, a discharge pipe extending from said wall around said screen, a valve in said discharge pipe, a dust box connected to said cleaner, a valve controlled discharge pipe connected to said dust box, means for forcing air under pressure through said dropper and cleaner, means for heating said air, said valves being adjustable to regulate the pressure of the air through said apparatus.

JEFFREY JOHN WALLACE.